(12) United States Patent
Moreno

(10) Patent No.: US 6,351,225 B1
(45) Date of Patent: Feb. 26, 2002

(54) MULTIMEDIA PC KEYBOARD EXTENDED WITH MUSIC CONTROL KEYS

(75) Inventor: Enrique I. Moreno, 103 Kellogg Ave., Palo Alto, CA (US) 94301

(73) Assignee: Enrique I. Moreno, Palo Alto, CA (US)

(*) Notice: Subject to any disclaimer, the term of this patent is extended or adjusted under 35 U.S.C. 154(b) by 0 days.

(21) Appl. No.: 09/369,228

(22) Filed: Aug. 5, 1999

(51) Int. Cl.[7] .............................................. H03K 17/94
(52) U.S. Cl. .............................. 341/22; 84/744; 84/745
(58) Field of Search ............................. 341/22; 84/744, 84/745, 600; 345/168

(56) References Cited

U.S. PATENT DOCUMENTS 5,565,641 A * 10/1996 Gruenbaum ................. 84/615
5,646,648 A * 7/1997 Bertram ....................... 341/22
6,063,994 A * 5/2000 Kew et al. .................... 84/600

* cited by examiner

Primary Examiner—Timothy Edwards
(74) Attorney, Agent, or Firm—Lumen Intellectual Property Services, Inc.

(57) ABSTRACT

A dual mode keyboard system with a modified keyboard arrangement allows PC users to have real-time control of MDI data. By toggling the keyboard system between a MIDI data input mode and an alphanumeric data input mode. The key board used in the current invention may either be a separate unit connected to a PC through a keyboard port or may be integrated as a single unit with PC hardware. The keyboard preferably has keys that are capable of operating in MIDI input mode and that are positioned at the top portion of the keyboard. The MIDI input keys are arranged to represent a keyboard instrument, such as a piano. The keyboard also has a MIDI control section for toggling between the MIDI input mode and the alphanumeric input mode, wherein the control section also has keys for choosing operating transposition octave levels of MIDI input keys. The keyboard is typically interfaced with the keyboard driver program and operating system or CPU of the PC. MIDI data inputted from the keyboard can directed through a sound card or music application software, before being played by and audio system or being sent to an external MIDI instrument. The dual mode keyboard system of the current invention provides for a simple and low cost alternative to current MIDI data manipulation systems.

13 Claims, 4 Drawing Sheets

MULTIMEDIA PC KEYBOARD EXTENDED WITH MUSIC CONTROL KEYS

FIELD OF THE INVENTION

The present invention relates to computer keyboards, and more particularly to a PC, laptop, or notebook computer keyboard having a set of additional function keys built-in for music control of a soundcard, on-board sound microprocessor, or other MIDI-driven installed devices or software.

BACKGROUND OF THE INVENTION

As PC soundcards or on-board sound microprocessors with synthesis capabilities and a MIDI interface have become an indispensable component of most PC systems in the multimedia-driven market, the real-time control that a user can exert over such soundcard synthesizers is currently ignored in the majority of cases due to the lack of an unobtrusive MIDI control interface. At the same time, both amateur or professional music publishing and sequencing are accomplished nowadays by means of specialized software running on desktop or laptop systems, which enabled by a soundcard with a MIDI interface, or by a stand-alone MIDI interface allow an editor to enter raw MIDI data. Currently, the available devices in the market that can be used to send external, real-time MIDI control data to either a soundcard's synthesizer or to a stand-alone MIDI interface serving editing/publishing software are relatively large and bulky musical instruments or miniature performance controllers, which in many cases are still inconvenient, inappropriate, or impossible to manage on the usually reduced desktop space setting in which most home and office PC or portable systems are set. The same situation is becoming more and more poignant as software-based DSP synthesis systems running on PCs begin to appear in the market because as personal computers become more powerful, users will no longer need to depend on dedicated hardware for sound generation. Software synthesizers will perform the same functions at a lower cost, and will allow for simple upgrades as technology changes.

In addition, the wide variety of existing external MIDI instruments tend to have higher market prices because their main purpose is to provide high-quality audio signals and/or a natural performance interface full of features and useful to professional musicians. But given that the price of available external MIDI instruments or controllers could be comparable or even greater than that of a complete multimedia PC system, it is frivolous, for most general users, to purchase a MIDI instrument or a professional controller just to provide some musical means of control over their soundcard's synthesizer (given that most general PC multimedia users are not professional musicians) and, as mentioned before, in any case, their size makes them generally inconvenient on a desktop setting. On the other hand, for professionals of music publishing or sequencing, a MIDI input interface is as necessary as a computer mouse and an alphanumeric keyboard, so, again, the bulk and size of a MIDI musical instrument make simple data entry a somewhat awkward and space-demanding undertaking. It is therefore one purpose of this invention to provide a new type of PC keyboard which gives its users access to MIDI real-time control without the extra space demands that an additional, physically separate control device unit necessarily requires.

It is another purpose of this invention to provide for said new type of PC keyboard in a manner which permits the normal and simultaneous use of both, MIDI control functions, and the customary alphanumeric functions of a PC or laptop keyboard on a single unit device.

One more purpose of this invention is to provide said new type of PC keyboard device for MIDI control in such an absolutely basic manner of design and simplicity of operation, that users not acquainted with the multiplicity of functions associated with full or professional MIDI instruments (such as tone generation, MIDI-in, MIDI-thru, system messages, channel messages, bulk dumps, etc., and all the buttons, sliders, panels, displays, inputs, outputs, jacks, cables and peripherals that go with them) may not find themselves in the necessity of learning about such operations, interfaces, and peripherals in order to properly operate this invention.

Yet another purpose of this invention is to provide said new type of keyboard with such simple and basic design for its construction that its final price to the multimedia mass consumer may be comparable to other inexpensive standard PC keyboards.

SUMMARY OF THE INVENTION

The present invention is a new kind of multimedia computer keyboard, which, in addition to the alphanumeric typing keys that are customary to most PC's typing keyboards possesses a built-in set of additional keys arranged and designed in a manner suitable for music control, as well as device-driving software capable of translating said additional music control keys' signals into MIDI messages for real-time control of a soundcard or an internal on-board sound chip, or for real-time control of music software installed in the host, or for real-time control of an MIDI instrument external to the computer unit to which said new multimedia computer keyboard with additional music control keys is connected.

All embodiments of this invention consist of a PC keyboard, which may be a separate unit or an integrated component of a portable laptop, notebook or palmtop computer, and which contains all the components of a usual PC alphanumeric typing keyboard, including its usual software device driver, the usual cable bringing in power to the unit from a and conveying the unit's alphanumeric interrupt signals to a PC's keyboard port PC (in the case of a separate unit), an extra set of standard keys placed on the posterior part of the unit in an arrangement and design reminiscent of a piano keyboard, and three more standard keys with associated indicator lights used to switch octave-transposition levels. Underneath all keys, there lies a correspondingly extended interruption detection matrix, which is exactly the same one used to detect actuation from the other alphanumeric keys, and which lies on the same circuit board. Such extension consists of the addition of several more interruption circuits, corresponding to the added keys for music control, and several output-state octave-transposition indicator lights. One of those added keys that are particular to this invention, imprinted with the words "MIDI Lock", or similar indicative words, is used to activate or deactivate the musical function of all other added keys, which, when not activated, are interpreted by the keyboard device driver program as standard keyboard-F1-to-F12 "function and lock" keys. Other two keys are used to switch octave-transpositions of the music keys (when these are active). A set of underlying indicator lights displays the current active (MIDI control) or non-active (normal "function keys" control) state of the added set of keys, as well as the current transposition state of the music keys.

The music keys actuate on the posterior part of the underlying extended detection matrix in the same usual manner as the alphanumeric keys do on their underlying anterior portion of it. As the music keys (previously activated in MIDI control mode) actuate on their underlying detection matrix, keyboard interruption signals with codes different from those already assigned to the usual alphanumeric keys are generated in the usual manner at the unit's main microprocessor—which contains additional code to handle signals from the added keys—and sent in the usual manner (through the usual cable and usual PC's keyboard port, in the case of a separate unit) to the keyboard's driving software. The keyboard device driver software program or software program set manages the tasks of translating those appropriately coded interruption signals corresponding to the additional the music control keys into basic Note-On MIDI data, which by means of the host PC's operating system and CPU are ultimately conveyed to an active device connected to the host (such as a soundcard or an on-board sound microprocessor or an external MIDI port) or an active installed application (such as a sound synthesis software program or a music publishing/sequencing software program) actively waiting for MIDI input and possibly ready to pass it along to other internal or external hardware.

The driver software implements only one kind of MIDI message, a "Note-On" message, consisting of three bytes, to each of which a "0" "start" bit is prepended, and a "1" bit appended. The first byte is always transmitting on MIDI Channel One, and is always a Note-On message, and is always equal to 10010000, in binary notation, or 90h, in hexadecimal notation (144, in decimal). The second and third bytes represent MIDI Note Number and MIDI Velocity respectively. Since the alphanumeric keyboard mechanism on which the operation of all music control keys will most likely lack velocity-detecting circuits, the possible values for the third byte are restricted to either zero or 64 only. A velocity value of 64 is always automatically generated for a Note-On, indicating that a music key has been depressed (if the keyboard's output state is in MIDI Lock mode). If the keyboard's output state is in MIDI Lock mode, a velocity value of zero is automatically generated by the driver whenever the keyboard's microprocessor detects that a previously-depressed music control key has been released. In this manner, and unless the keyboard unit is specifically built with velocity-detecting circuitry—in which case velocity values can be made to range normally The driver software implements only one kind of MIDI message, a "Note-On" message, consisting of three bytes, to each of which a "0" "start" bit is prepended, and a "1" bit appended. The first byte is always transmitting on MIDI Channel One, and is always a Note-On message, and is always equal to 10010000, binary notion , or 90h, in hexadecimal notation (144, in decimal). The second and third bytes represent MIDI Note Number and MIDI Velocity respectively. Since the alphanumeric keyboard mechanism on which the operation of all music control keys will most likely lack velocity-detcting circuits, the possible values for the third byte are restricted to either zero or 64 only. A velocity value of 64 is always automatically generated for a Note-On, indicating that a music key has been depressed (if the keyboard's output state is in MIDI Lock mode). If the keyboard's output state is in MIDI Lock mode, a velocity value of zero is automatically generated by the driver whenever the keyboard's microprocessor detects that a previously-depressed music control key has been released. In this manner, and unless the keyboard unit is specifically built with velocity-detecting circuitry—in which case velocity values can be made to range normally from 0 to 127, the receiving sound-generating hardware can control the onset and duration of music sounds. This manner of operation makes possible polyphonic playing (that is, the playing of simultaneous notes perceived to be sounding at the same time) which becomes possible as long as the user holds one or more of the keyboard's music control keys down.

One of said indicator lights particular to this invention displays the active or inactive output state mode of the music control keys. Thus, in order to cause the driver to send MIDI data to the operating system/CPU, the user must first activate MIDI Lock mode by depressing once the key that is imprinted with the words "MIDI Lock", or by assessing that said corresponding indicator light is on. If said indicator light is off, those of the added music control keys which are imprinted with the "F1"-to-"F12", etc. labels will cause the driver to interpret signals corresponding to them as standard keyboard "F1"-to-"F12"-etc. "function-and-lock" keys.

If said indicator light is on, the driver will generate and output MIDI data corresponding to MIDI note numbers within the range indicated by the currently lit transposition indicator light, which range can be physically switched several octaves up or down the musical scale by means of the two aforementioned added transposition keys. Octave transposition is a result of computation in the driver software; the octave transposition music control keys will set appropriate software flags that cause the driver program to add (transposition up) or subtract (transposition down) a numerical constant to the MIDI Note-Number value of a particular MIDI-active music control key. Thus, neither the keyboard hardware nor the sound hardware need to do octave-transpositions, since the driver keeps track of the last transposition level key depressed by the user on the keyboard, and uses this value to compute and send a transposed (or un-transposed) MIDI Note-Number code to the target sound hardware or software or external MIDI port.

Alternatively, if the MIDI Lock light is currently lit, some of the music control keys can still be used to cause the driver to interpret "F1"-to-"F12"-etc. "function-and-lock" signals by pressing one of the "function-and-lock" keys at the same time that one of the "Shift" or "Command" keys is held—or other such similar standard control key.

The size, width, and length of this invention when built as a separate unit (e.g. not as the keyboard of a laptop, etc.) do not need exceed that size, width, or length which are customary of most standard alphanumeric PC typing keyboards (about 17 to 20 inches in length from left to right, and 7 to 9 inches in width form front to back).

The operation of the alphanumeric keys of this invention is entirely equal to that of the music keys, since both input and output are the same for all keys of the unit. On the other hand, the physical components and construction of the keyboard conform to those of any standard PC alphanumeric keyboard, which construction, components, and operation are well understood and have been described before in many other active and expired patents and disclosures, and therefore are not relevant to this disclosure, since it is up to a manufacturer of this invention to choose among the great variety of active or expired components and modes of construction and operation for PC keyboards.

Similarly, the manner in which the device driver sorts and translates signals in general from the keyboard's keys, and the manner in which these data are conveyed by the operating system/CPU to the soundcard or MIDI-receiving music software depends on the great variety of keyboard designs, keyboard microprocessors, operating systems and CPUs, and is already well understood.

This invention does not specify the contents and layout of the alphanumeric section of the keyboard, which are assumed to be standard for a given operating system, and which may include a variety of non-related layouts (such as the so-called "ergonomic") or a variety of related features or devices (such as pointing devices).

The uniqueness of this invention, therefore, stems from the original manner in which the standard typing keyboard has been extended with additional hardware music control keys, from the particular musical, "piano-style" arrangement and layout of such extra music control keys, form the fact that these music control keys are used to ultimately send MIDI messages to music hardware or software, from the fact that some of these music control keys can be toggled to operate as normal PC "function" keys or simultaneously music and function keys, from the fact that the keyboard device driver software is specifically used and written to include translation and control of data from said music control keys, from the use and management which the keyboard's device driver makes of the extra music keys' control signals to obtain octave transposition and polyphony, and from the fact that the keyboard's device driver sends MIDI messages to hardware or software installed in the keyboard's host PC or other external MIDI device.

Consequently, the essence of this invention is the evolution of a standard PC alphanumeric typing keyboard into an input device capable of providing complete real-time multimedia control to its associated computer—including music control input—while maintaining the usual size, characteristics, and expected manner of operation of any standard computer keyboard.

Brief Description of Drawings

Other objects, features and particularities of this invention will occur from the ensuing detailed descriptions and appended claims when taken in conjunction with the accompanying drawings, in which:

DESCRIPTION OF PREFERRED EMBODIMENTS

Figure 1:
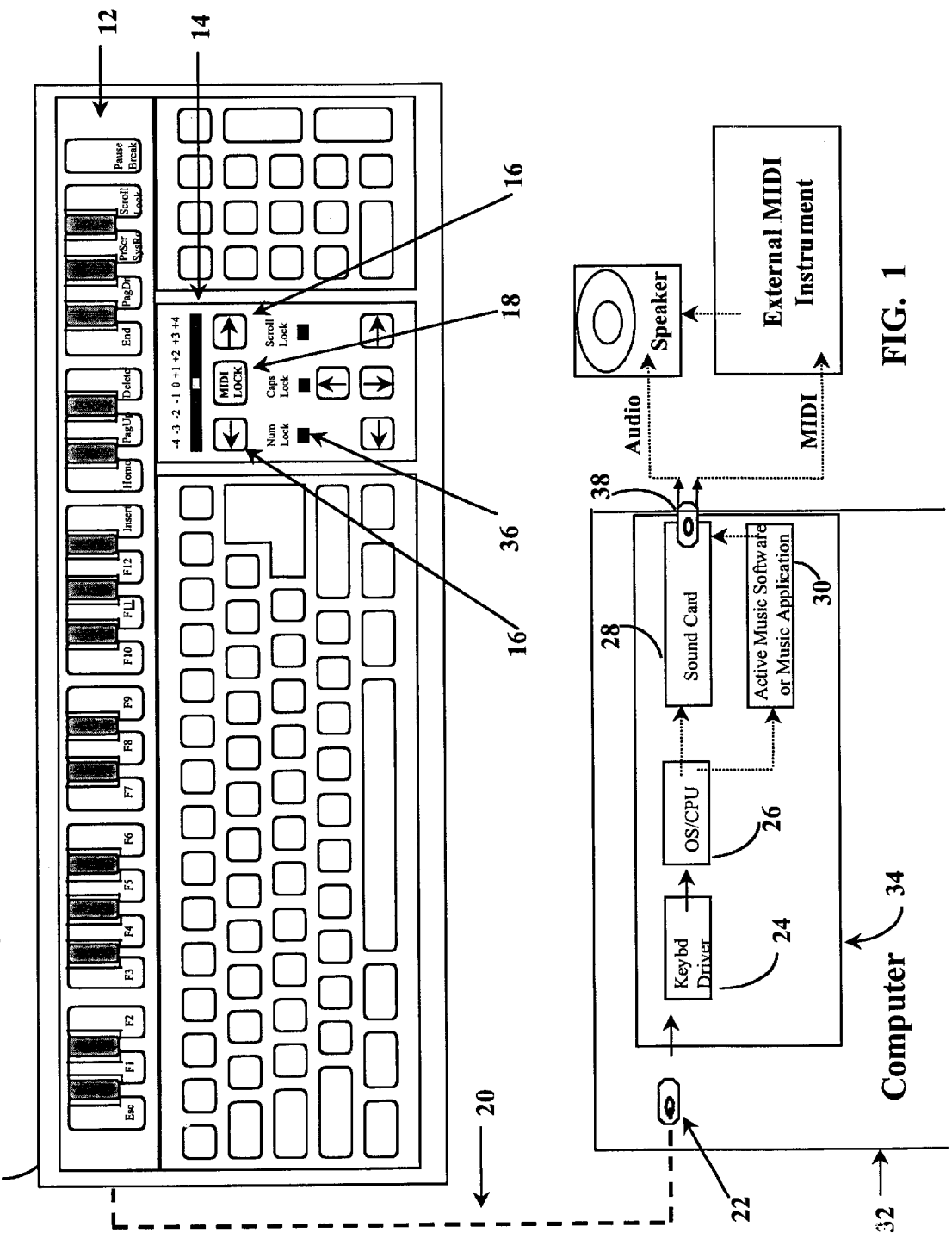
FIG. 1 is a schematic representation of a preferred embodiment of this invention along with a related diagram indicating signal flow

Referring to FIG. 1, there is shown a schematic representation of a preferred embodiment of this invention, where an extended PC typing keyboard unit 10 has been built with additional keys 12, 16, and 18, and their corresponding underlying mechanisms and detection switches on a correspondingly extended underlying board (not shown in the FIG.). There is also an additional set of indicator lights 14 used to display whether the added keys 12 and 16 are currently active in MIDI mode, and if so, at which transposition level. The rest of the keys and indicator lights on the unit 10, and their general arrangement correspond to what is normally found and expected in various standard PC keyboards. A cable 20 (needed only when the keyboard is a physically separated unit) conveys the keyboard interrupt signals to a PC's keyboard port 22. In another variant of the preferred embodiment, such as one where the keyboard is built onto a portable computer (laptop, notebook, or palmtop computer) the cable 20 is unnecessary, and 22 is internal. Inside the box 32, symbolizing a PC, a diagram box 34 represents the flow of signals and data, where a keyboard driver program 24 translates incoming keyboard signals from 22, and when these correspond to activated music keys, translates them into corresponding MIDI Note-On data, which by means of the operating system/CPU 26 reach their intended hardware (soundcard/on-board music chip 28) or software 30 target. MIDI control data can be further re-routed from an application or from sound hardware (or both) to an external MIDI-enabled device through an output port 38 (generally a MIDI/audio port found on most soundcards) or through a similar dedicated MPU-401-type port or a MIDI interface connected to a serial port.

In the preferred embodiment, the added keys 12 are built with an elongated appearance, some of them being smaller and of a darker plastic hue (corresponding to a piano's "black" keys) and some longer (corresponding to the piano "white" keys) and with a lighter hue. The number of all the keys 12 in the preferred embodiment is 37, or three complete octaves plus one more key of the musical scale, where key #13 corresponds to middle "C" or MIDI Key Number 60. The "white" keys in 12 are imprinted on their anterior surfaces with the "Esc", "F1", "F2", "F3", etc, to "F12", "Print Scrn/SysRq", "Scroll Lock", "Pause/Break", "Insert", "Home", "Page Up", "Delete", "End", "Page Down" labels of the traditional PC keyboard function keys. Such imprints indicate the expected output control signal when the keys 12 are not in MIDI lock mode or when, despite of the keyboard's current output state being on MIDI lock mode, one of the "Shift" keys is depressed and held while at the same time depressing one of the above mentioned "function" keys. In this latter case, the driver interprets the signal so elicited as a dual instruction which causes a MIDI message to be sent, and a "function" interrupt instruction—corresponding to the function imprinted on the key—to be sent also. The additional "black" keys in 12 can also have dual functions and may bear different imprints corresponding to other optional functions, such as control over other multimedia devices integrated or peripheral to the host PC.

In another embodiment, the number of the keys 12 is not exactly 37—though all embodiments of this invention share some form of the geometrical arrangement of "black and white" piano style keys, and this is a distinct characteristic of this invention.

In yet another embodiment, the traditionally rectangular and elongated form of the keys 12 has been suppressed in favor of a more space-economic form by restricting the size and form of all the keys 12 to that standard smaller size and square form of such traditional alphanumeric keys as the "Q", "W", "E", etc. keys.

Figure 2:
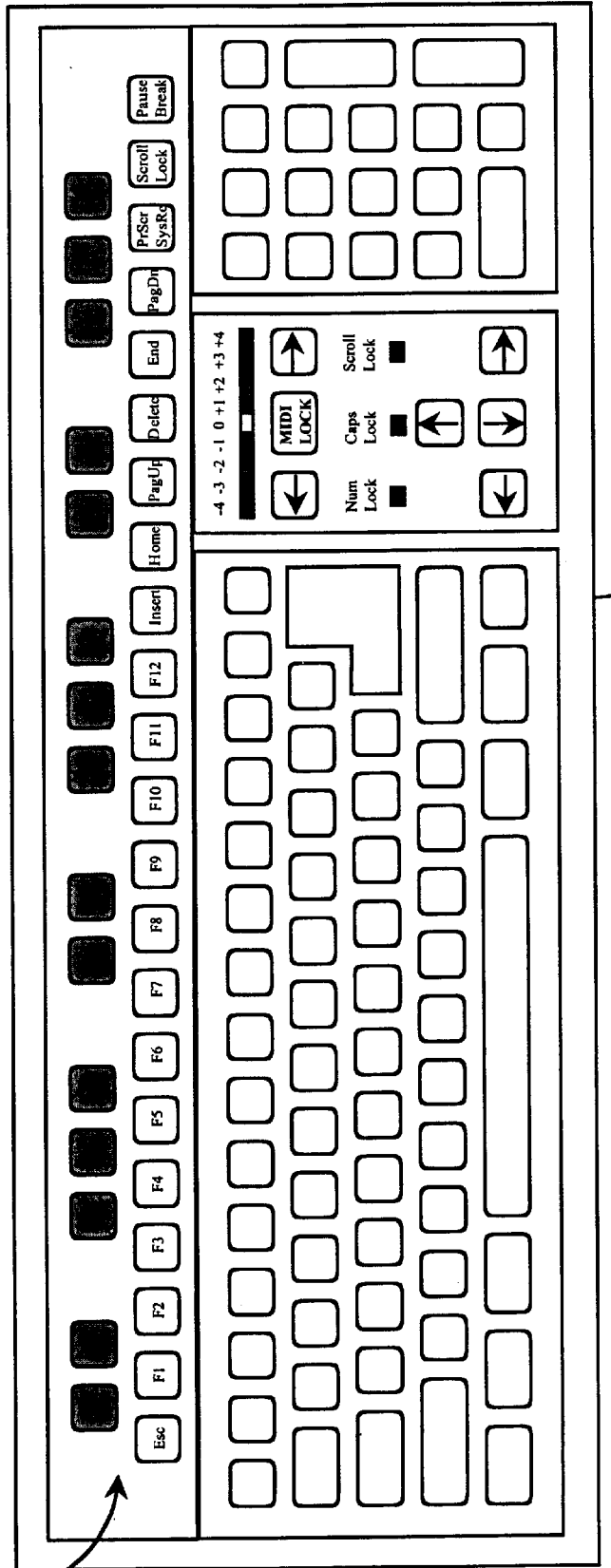
FIG. 2 is a schematic representation of the external appearance of another embodiment of this invention

Thus, referring now to FIG. 2, therein is shown a schematic representation of said other embodiment of this invention, which is particularly suited, but not restricted to a smaller, portable computer where the keyboard is not physically separated from the computer, and where the extended typing keyboard 40 has been built with the additional keys 42, which are made square and smaller in form rather than rectangular and larger. In one more embodiment, the form of the keys 42 is circular, and in yet one more embodiment the hues of the keys 42 are inverted, such that the traditionally "white" piano-style keys appear darker, and the traditionally "black" piano-style keys appear lighter. In yet one other embodiment, the color hues of the keys 42 are varied and colorful, such as in a design made to appeal to children, where every pitch class of the musical scale is cast in a different color.

Figure 3:
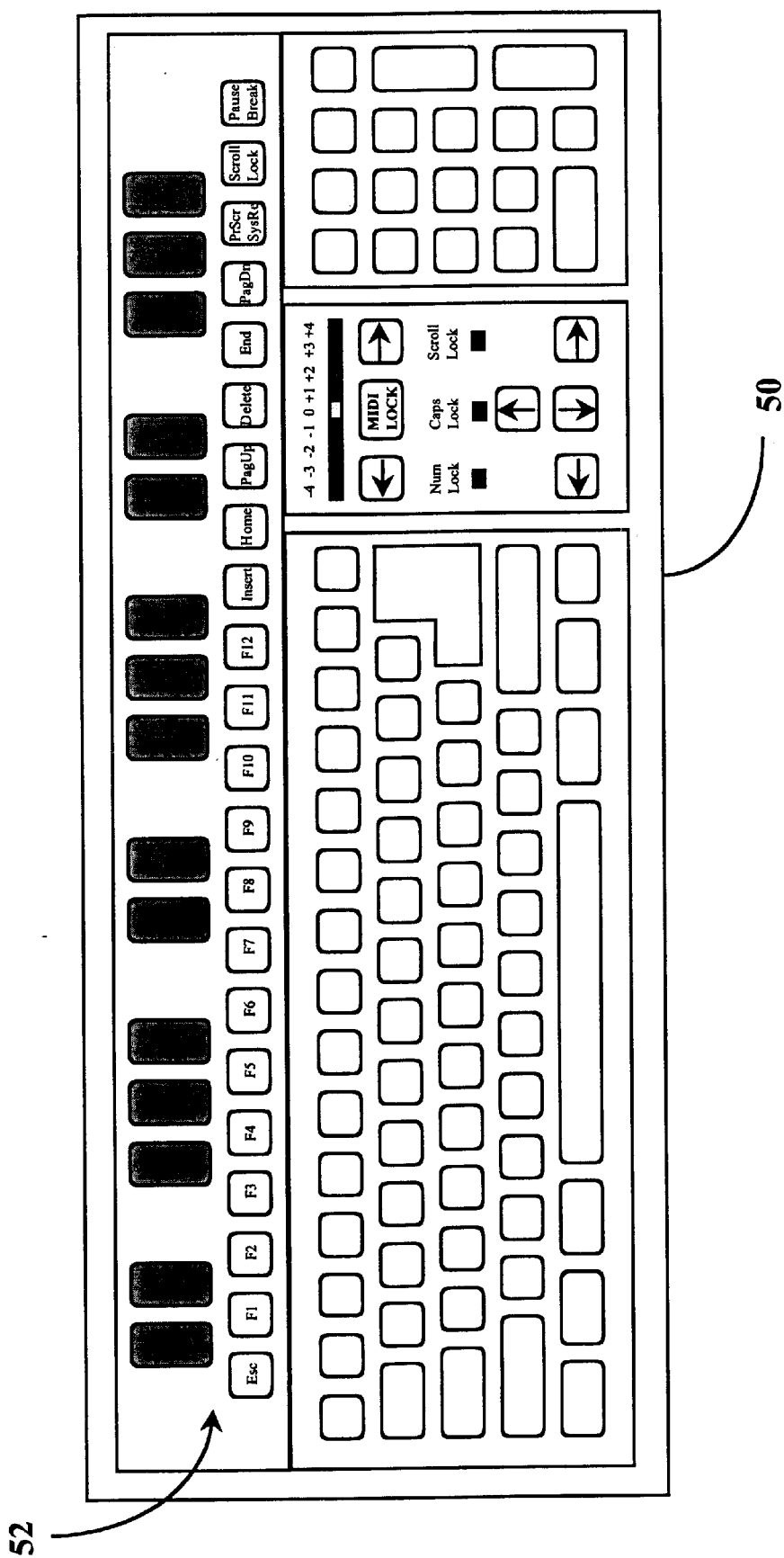
FIG. 3 is a schematic representation of the external appearance of yet another embodiment of this invention

Referring to FIG. 3, therein is shown one more embodiment of this invention, where the extended keyboard 50 has been built with the additional "black and white" piano-style keys 52 that are characteristic to this invention, and which, when "white", they are made square and smaller in form rather than rectangular and larger, and when "black", they are made rectangular and elongated. This mixed-size design constitutes the second-preferred embodiment, if that may be said, given that it is a compromise between the desirable economy of space afforded by the all-small-and-square-keys embodiment, and the desirable more musical appearance of the all-rectangular-and-long-key embodiment.

Referring back to FIG. 1, the keys 16, 18, and associated indicator lights 14 occupy, in the preferred embodiment, that area of the keyboard which is usually assigned in most PC keyboards to the traditional six "function" keys "Insert", "Home", "Page Up", "Delete", "End", and "Page Down", which, as noted above, have been made to share a physical key with the so-called "white" music keys of 12. Such sharing of the same physical keys has freed space for the keys 16, 18, and associated indicator lights 14 which are characteristic of this invention, and also for the three traditional indicator lights 36 usually labeled "Num Lock", "Caps Lock", and "Scroll Lock".

Figure 4:
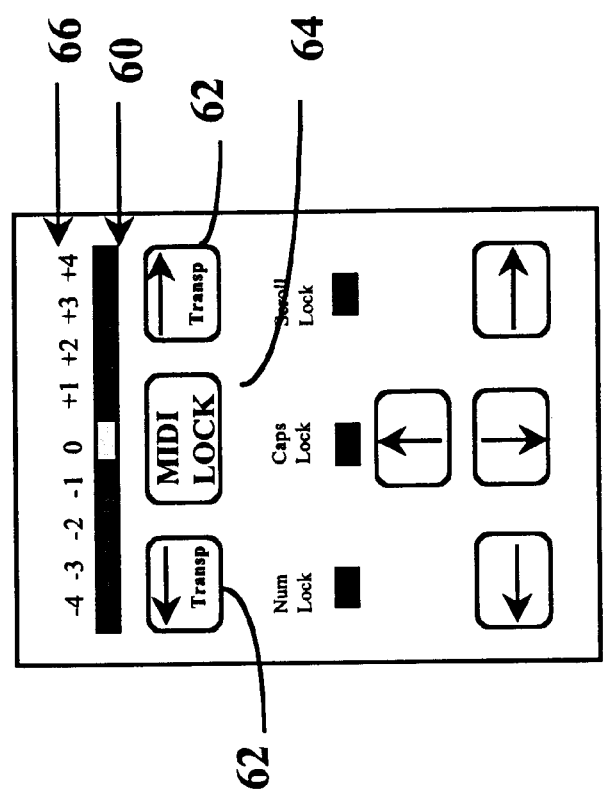
FIG. 4 is a schematic representation of the MIDI Lock and transposition keys of a preferred embodiment this invention, along with their associated indicator lights

A detailed view of said area is shown in FIG. 4, to which now reference is made, and where the central key 64, imprinted with the words "MIDI Lock" is flanked by the octave transposition keys 62, which bear the imprints "Transp" and respective right or left pointing arrows to indicate the direction of transposition. A series of nine continuous, horizontally arranged plastic windows 60 serve to cover and protect their underlying indicator lights and switches used to display a selected current transposition level of the music keys. Every one of the small windows has an ideal length of about three sixteenths of an inch from left to right in a separate-keyboard unit embodiment.

Alternatively, in another smaller (portable) embodiment, a continuous window strip of approximately one and five sixteenths of an inch is used to house the underlying indicator lights. In other embodiments, said window length may vary.

In the preferred embodiment, indicator lights 60 are labeled with imprints 66 bearing the ciphers from –4 to zero to +4. The keys 62, each bearing an imprint of an arrow in opposite directions are used to toggle the current octave transposition level of the music control keys and to cause the appropriate indicator light to light up underneath its correspondingly labeled window or portion of the window. By actuating on the arrow keys 62 an appropriate number of times, or simply by keeping one of these keys 62 depressed, the user steps up or down a transposition state—which is concurrently shown by the lighting of the appropriate indicator light—and enables the user to select the final transposition output state of the music control keys. The output state codes for the music keys are switched internally in the same manner as the "Shift" or "Ctrl+Shift", etc., keys alter the output state of the standard alphanumeric keys (for example, from small-case to capitalized characters).

In another embodiment, the transposition keys 62, their indicator lights 60 and corresponding labels 66 are found at a different place on the unit, their exact location being irrelevant to their function and operation.

In yet one more embodiment, the nine indicator lights 60 are substituted by a single LED numerical display and underlying circuits, which, when lit, displays not only the negative, zero, or positive number corresponding to the current transposition state of the music keys, but also the fact that the music keys are currently in MIDI Lock mode.

Figure 5:
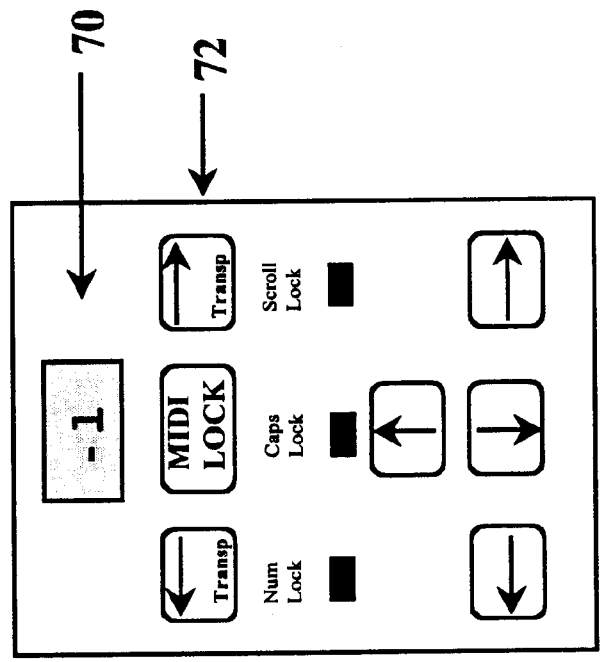
FIG. 5 is a schematic representation of the MIDI Lock and transposition keys of another embodiment this invention, along with their associated indicator LED

Referring now to FIG. 5, therein is shown the appearance and arrangement of the transposition and MIDI Lock keys 72, and said numerical LED display 70 in the preferred embodiment.

Referring back to FIG. 1, in the preferred embodiment, the manner of interaction between the physical music control keys of the keyboard 12, 16, 18, and their driver software 24 starts when a user depresses the unlit, inactive MIDI Lock music control key 18. Then a corresponding flag in the driver program is set to TRUE. As long as this flag is TRUE, the driver program assigns a TRANSPOSITION_LEVEL variable a value between –4 and +4 whenever the user toggles octave transposition level by means of the transposition music control arrow keys 16, or, if these transposition music control arrow keys 16 have not been toggled yet, the TRANSPOSITION_LEVEL variable remains at its default value =0. Then, whenever the driver program 24 detects an incoming signal from the music control keys 12 of the keyboard, the current TRANSPOSITION_LEVEL value is multiplied by twelve and the result of this multiplication added to the MIDI Note Number value correspondingly mapped to the incoming signal from said music control key 12; this final MIDI Note-Number value is what the driver outputs to a soundcard, a sound chip, or an active music software program currently controlling the sound hardware.

What is claimed is:

1. A dual mode keyboard system for inputting MIDI data to a MIDI data processor and inputting alphanumeric data to an alphanumeric data processor, said keyboard system comprising:
   a) an extended keyboard unit with data input keys for inputting key stroke data, wherein the extended keyboard comprises a lower section and an upper section, the lower section comprising an alpha typing section, a numeric typing section and a control section, the upper section comprising a row of function keys and an added row of keys, wherein the row of function keys act as white piano keys when in MIDI data input mode and act as function keys when in alphanumeric data input mode, and the added row of keys act as black piano keys when in MIDI data input mode;
   b) a means for toggling said keyboard system between the alphanumeric data input mode and the MIDI data input mode; and
   c) a keyboard interface driver program for translating keystroke data into alphanumeric data with said keyboard system in said alphanumeric data input mode and translating said keystroke data into MIDI data with said keyboard system in said MIDI data input mode.

2. The dual mode keyboard system of claim 1 wherein said data input keys are interfaced with a extended interruption matrix housed within said keyboard unit and wherein depressing said data input keys generate said key stroke data.

3. The dual mode keyboard system of claim 1 wherein said row of function keys comprises twenty-two keys and said added row of keys comprises fifteen keys.

4. The dual mode keyboard system of claim 3 wherein said row of function keys comprises light colored keys and said added row of keys comprises dark colored keys, wherein said dark colored keys partially overlap said light colored keys to give the appearance of a piano keyboard.

5. The dual mode keyboard system of claim 1 wherein said MIDI data processor further comprises:

a) a microprocessor in communication with said keyboard driver program; and b) an audio nprocessing unit capable of producing audio sound from MIDI data.

6. The dual mode keyboard system of claim 5 wherein said audio processing unit is selected from the group consisting of a sound card and a sound chip.

7. The dual mode keyboard system of claim 5 wherein said MIDI data processor comprises a) a MIDI software program for editing MIDI data; and b) a means for displaying MIDI data.

8. The dual mode keyboard system of claim 1 wherein said means for toggling between said alphanumeric data input mode and said MIDI data input mode is a MIDI lock key that toggles between said alphanumeric data input mode and said MIDI data input mode with each depression of said MIDI lock key.

9. The dual mode keyboard system of claim 8 wherein said MIDI lock key is positioned within said control section.

10. The dual mode keyboard system of claim 9 wherein said control section further comprises a light display that illuminates when said dual mode keyboard system is in said MIDI data input mode.

11. The dual mode keyboard system of claim 10, further comprises a means for changing an indicated operating transposition octave level within a range of octave levels while said dual mode keyboard system is in said MIDI data input mode.

12. The dual mode keyboard system of claim 11 wherein said means for changing said indicated operating transposition octave level within said range of octave levels comprises at least two scroll keys positioned within said control section, wherein one of said at least two scroll keys increases said indicated operating transposition octave level and a second of said at least two scroll keys reduces said indicted operating transposition octave level.

13. The dual mode keyboard system of claim 12 wherein said range of octave levels is indicted in a section of said light display with labels −4 to +4.

* * * * *